Feb. 19, 1963 J. B. BAKER 3,077,798
DRILL BIT AND METHOD OF BRAZING
Filed March 21, 1960 2 Sheets-Sheet 1

INVENTOR:
JOHN B. BAKER
BY Gravely, Lieder & Woodruff
ATTORNEYS.

Feb. 19, 1963  J. B. BAKER  3,077,798
DRILL BIT AND METHOD OF BRAZING
Filed March 21, 1960  2 Sheets-Sheet 2
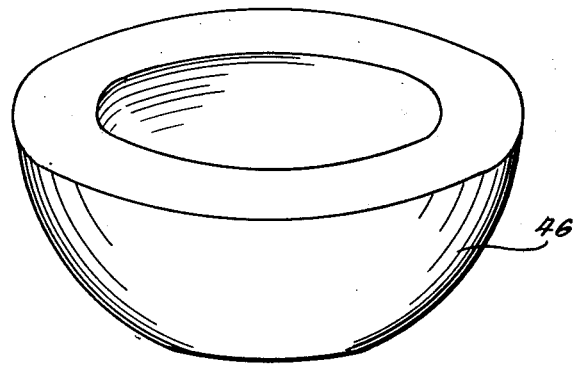
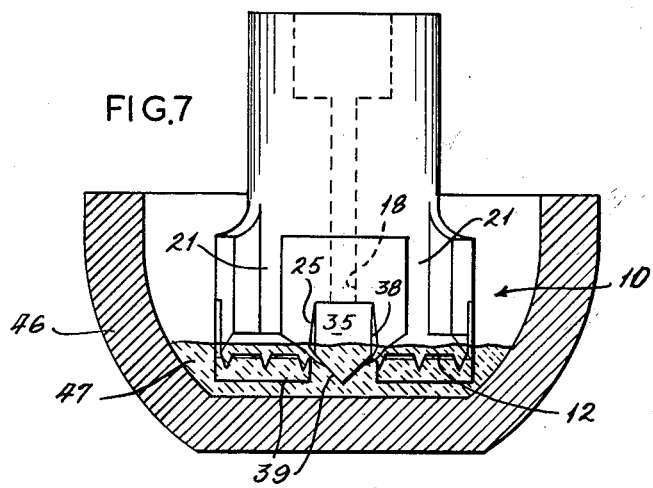
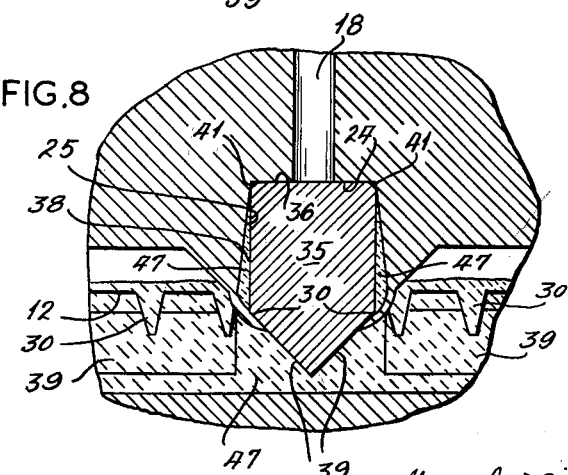
INVENTOR:
JOHN B. BAKER
BY Gravely, Lieder & Woodruff
ATTORNEYS.

3,077,798
DRILL BIT AND METHOD OF BRAZING
John B. Baker, Canton, Ohio, assignor to The Timken Roller Bearing Company, Canton, Ohio, a corporation of Ohio
Filed Mar. 21, 1960, Ser. No. 16,210
6 Claims. (Cl. 76—108)

The present invention relates to drill bits and particularly to drill bits having cutter inserts brazed within radial grooves provided therefor in the working end of the bit. The invention further relates to a novel method of brazing said cutter inserts to said grooves.

Presently, cutter inserts are brazed to a bit head by placing the head with the groove or grooves uppermost, inserting an excess of braze in the base of the groove, and positioning the insert in the groove to force the braze up into the space between the insert and the groove side walls. This method ordinarily produces a satisfactory bond between the insert and the bit head, but the excess braze tends to run into the fluid channels which open on the forward face of the bit head and the fluid also gets on the bit body between the wing ends and the back face section.

Inserts also are brazed to cutter heads by applying the braze to the insert prior to placing it in the groove. This method requires that a finishing application of braze be applied to the front face of the head to fill the corners between the cutter and the groove. While this method also ordinarily produces a satisfactory bond between the cutter and the head, it is cumbersome and the finishing coating of braze tends to clog the air holes in the bit head.

Furthermore, when present bits are first put into operation, the bond between the insert and the groove occasionally is broken and the cutter insert "pops" out of the groove or becomes loose and subsequently is dislodged from the groove and lost. This is expensive for the operator and causes inefficient operation of the drill bit.

It is an object of the present invention to provide a drill bit and a method of brazing inserts to a drill bit which obviates the hereinbefore discussed difficulties. Another object is to provide a drill bit wherein the cutting inserts are mechanically retained in the bit head to prevent their being lost if loosened during the drilling operation. Still another object is to provide a method of brazing cutting inserts to grooves in a bit head which produces a drill bit in which the fluid passageways and cutting face are free of excess braze.

These and other objects and advantages will become apparent hereinafter.

The invention comprises a drill bit having a cutter insert brazed and mechanically retained in a groove provided therefor in the face of the bit head. The invention further includes a method of brazing a cutting insert to a groove in a bit head wherein the drill bit and insert are brazed with the cutting face of the drill bit downward.

In the following drawings, wherein like numerals refer to like parts,

Figure 4:
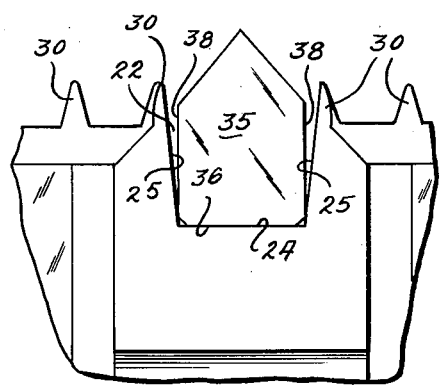
Figure 5:
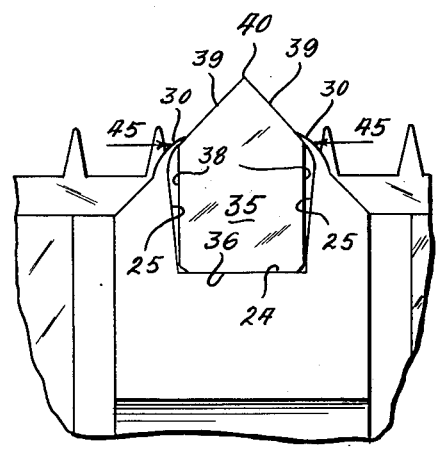

FIG. 4 is a greatly enlarged fragmentary view of a bit head showing an insert positioned in a slot therefor, FIG. 5 is a greatly enlarged fragmentary view similar to FIG. 4 and diagrammatically showing a hydraulic press, FIG. 6 is a perspective view of a brazing cup, FIG. 7 is a side view showing the brazing step with the cup in section and the bit in detail, and FIG. 8 is a greatly enlarged fragmentary sectional view showing the inserts brazed to the bit with the bit still positioned in the brazing cup.

Figure 1:
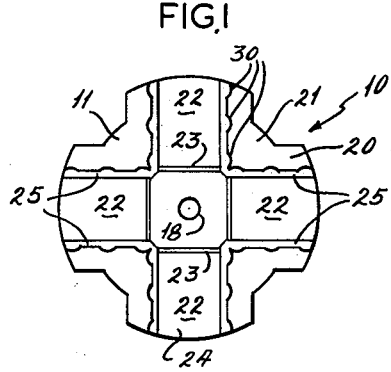
FIG. 1 is a top plan view of a bit head.
Figure 2:
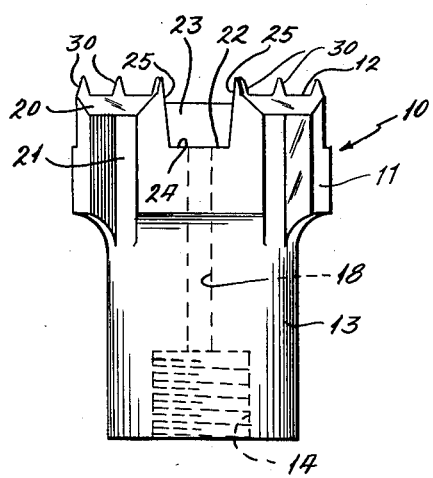
FIG. 2 is a side elevational view of a bit head.

FIGS. 1 and 2 show a bit 10 formed in the conventional manner in that a bar is slugged and upset to form a head portion 11 having an outer face 12 and a slimmed shank portion 13 having a threaded opening 14 adapted to engage a drill rod (not shown). The present invention also is suitable for separable drill bits having tapered socket connections with the drill rod and for integral steel drills. The threaded connection 14 is shown only for purposes of illustrating the invention.

After the bit 10 is slugged and upset, the head portion 11 is coined to finished shape in a suitable machine. The finished head portion includes a passageway 18 opening to the center of the bit face 12 and wings 20 separated by valleys 21 and having slots 22 formed therein. Fluid is supplied to the cutting area through the passageway 18 to flush chips, etc. from the cutting area during a drilling operation. Other fluid carrying passageways opening onto the valleys 21 can be provided, if desired. The slots 22 have an end wall 23 near the center opening 18, a bottom wall 24 and side walls 25 tapering inwardly from the bit face 12 toward the bottom wall 24. Fingers or prongs 30 extend outwardly from the bit face 12 at the top edge of the grooves or slots 22.

Figure 3:
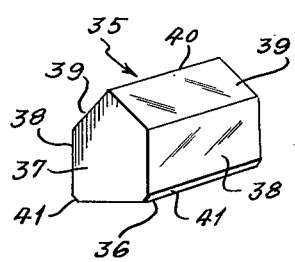
FIG. 3 is an enlarged perspective view of a cutting insert.

The inserts 35 (FIG. 3) include a bottom surface 36, ends 37, sides 38 and inwardly tapered cutting surfaces 39 joining in a cutting edge 40. An inclined planar surface 41 joins the sides 38 to the bottom 36. The inserts 35 can be any suitably hardened material such as carbide inserts, tungsten carbide or other material suitable for brazing to a bit head.

After the bit 10 has been coined to the shape indicated, it is cooled and annealed. The bit 10 and the inserts 35 are then cleaned using chemical process, sonic processes or combinations of sand, shot or silica blast well known to those skilled in the art. The bit slots 22 and the inserts 35 are fluxed prior to insertion of the inserts 35 in the slots 22.

After cleaning and fluxing, the inserts 35 are positioned in the slots 22 (FIG. 4) with the tapered slot side walls 25 and the insert sides 38 generally defining a V-shape having an apex where the slot bottom wall 24 joins the slot sides 25.

The fingers or prongs 30 then are urged toward and pressed against the converging surfaces 39 by a hydraulic press 45 (represented diagrammatically by the arrows in FIG. 5) to enclose the inserts 35 in the slots 22 with a positive mechanical force. The tips or outermost portions of the deformable extensions or fingers 30 are crimped against and overlie a portion of the insert surface 39 to secure the work engaging elements 35 in the slots 22 during the brazing procedure and during drilling operations.

The remaining inserts 35 are positioned loosely in similar slots 22 in the bit working face 12 and the prongs 30 are crimped against the surfaces 39 in exactly the same manner as hereinbefore described. The invention is also applicable to single insert bits as well as the shown multiple insert type.

The bit 10 and inserts 35 then are heated to the proper brazing temperature in a furnace (not shown) or if the bit is an integral bit, it is induction heated because of its size. After heating, the bit 10 and the retained inserts 35 are inverted and placed with the bit working face 12 downward in a receptacle 46, such as a ceramic cup containing fluid braze 47 (FIG. 7).

Both the braze filled receptacle 46 and the bit 10 remain heated to the brazing temperature in the furnace during the brazing operation hereinafter described.

As can be seen from FIGS. 7 and 8, only the insert cutting surfaces 39 and enough of the bit face 12 to seal the opening between the slot side wall 25 and the insert sides 38 is submerged in the braze 47. Thus the braze 47 is kept from entering the center fluid opening 18 and from contaminating the valleys 21 in the bit head 11. Since the openings on the bit face between the slot side walls 25 and the insert sides 38 are sealed from the air, the braze 47 will flow upward due to capillary attraction along the slot side walls 25 and the insert sides 38 to fill the V defined therebetween. Braze also fills the triangular passageway defined by the insert surface 41, the slot bottom 24 and the slot side wall 25. This provides sufficient braze 47 between the insert 35 and the slot 22 to provide the needed bonding and also keeps the braze out of the air holes 18 of the bit 10 and off the bit body between the wing ends and the back face section. The crimped fingers 30 mechanically retain the inserts 35 in the slots 22 so that if the braze bond breaks during drilling, the insert 35 is not lost, but stays in the slot 22.

The bit 10 is finished in the usual manner by washing off the flux, sand blasting and grinding the bit outside diameter to gauge.

The procedure hereinbefore described is suitable for both the shown thread type and the tapered friction lock type separable drill rods and bits. If this invention is utilized with an integral steel bit, the bit head is upset on the end of the steel, and the slots with the deformable extensions for retaining the single or multiple inserts are coined, using proper dollies and dies in the upsetting machine.

The integral steel is annealed, and the working end thereof is cleaned along with the inserts, using the same procedure as applied to the separable bits. The inserts and steels are fluxed and the inserts are placed in the slots after which the fingers are pressed against the inserts to retain them in the slots.

The steel is inverted and brazed in much the same manner as described for the separable bits. Because of the large size of an integral steel bit, the steels are induction heated rather than being heated in a furnace.

Thus it is seen that the present invention provides a novel bit and method of brazing which achieves all of the objects and advantages sought therefor.

The present invention is intended to cover all changes and modifications of the examples of the invention herein chosen for purposes of the disclosure which do not constitute departures from the spirit and scope of the invention.

What is claimed is:

1. A method of brazing cutting inserts in slots formed in the working end of a bit body including the steps of positioning the inserts in the slots with the sides of the inserts and the slots spaced apart sufficiently far to support capillary attraction of the brazing fluid, and positioning the working end of the bit body with the inserts in a brazing fluid only deeply enough to immerse and seal the openings between the slots and the inserts so that the brazing fluid is pulled upwardly into said openings to fill the spaces between the inserts and the slots with the brazing fluid.

2. A method of brazing a cutting insert in a slot formed in the working end of a bit body, including the steps of positioning the insert in the slot with the slot sides and the insert sides spaced apart sufficiently to support capillary attraction of the brazing fluid, mechanically retaining the insert in the slot, positioning the working end of the bit body with the retained insert in brazing material only deeply enough to immerse and seal the openings between the slot and the insert so that the brazing fluid is pulled upwardly into said openings by capillary attraction to fill the spaces between the insert and the slot with brazing material.

3. A method of fastening a cutting insert in a slot formed in the working end of a bit body including the steps of forming the bit body with a deformable member on the working end adjacent the slot, loosely positioning the cutting insert in the slot, bending the deformable member upward toward the insert to overlie an exposed portion thereof, and positioning the working end of the bit body and the insert in a brazing fluid only deeply enough to immerse and seal the openings between the slot and the insert so that the brazing fluid is pulled upwardly into said openings by capillary attraction to braze the insert in the slot.

4. A method of fastening cutting inserts to a bit body, including the steps of forming wings on the working end of a bit body, forming slots in the wings, said slots converging from an open top at the bit face to a bottom wall, forming deformable fingers on the wings adjacent the slots, positioning the bit head with the working end upwardly, positioning cutting inserts in the slots, said inserts having side walls spaced from the side walls of the slots sufficiently to support capillary attraction, moving the fingers against and overlying a portion of the cutting inserts to mechanically retain them in the slots, inverting the bit and inserts, positioning the bit working end and the inserts in a brazing fluid sufficiently deep so that only the open end of the slots at the bit face are submerged in the brazing fluid and the rest of the bit body including the wings is maintained braze free and brazing the inserts to the slots at a suitable temperature in a furnace with the braze filling the space between the insert walls and the slot walls by capillary attraction.

5. A method of fastening cutting inserts in a slot formed in the working end of a bit body including the steps of positioning an insert in the slot with spaces between the slot side walls and the insert, positioning a portion of the working end of the bit including only a portion of the insert in a brazing material, maintaining the rest of the bit body substantially free of brazing material, and brazing the insert in the slot by capillary attraction whereby the brazing material moves upwardly between the slot walls and the insert to fill the spaces therebetween.

6. A method of fastening a cutting insert in a slot formed in the working end of a bit body including the steps of forming the bit body with a deformable member projecting forwardly of the working end adjacent to the slot, positioning the cutting insert in the slot with an exposed portion projecting forwardly of the working end of the bit body and with spaces defined between the slot side walls and the insert, urging the deformable member toward the insert to overlie a portion of the exposed surface thereof, submerging a portion of the working end of the bit body and only the exposed portion of the insert in a brazing fluid to seal the open end of the spaces between the slot edges and the insert, maintaining the rest of the bit body substantially free of brazing fluid, brazing the insert in the slot by capillary attraction whereby the brazing material moves upwardly between the slot side walls and the insert to fill the spaces therebetween, and removing excess braze from the working end of the bit body and the insert.

References Cited in the file of this patent

UNITED STATES PATENTS

| | | |
|---|---|---|
| 2,084,441 | Howard et al. | June 22, 1937 |
| 2,168,060 | Catland | Aug. 1, 1939 |
| 2,628,072 | Baker | Feb. 10, 1953 |
| 2,653,010 | Curtis | Sept. 22, 1953 |
| 2,973,047 | Edgar et al. | Feb. 28, 1960 |